United States Patent [19]
Poisner

[11] Patent Number: 5,890,004
[45] Date of Patent: Mar. 30, 1999

[54] METHOD AND APPARATUS FOR SIGNALING POWER MANAGEMENT EVENTS BETWEEN TWO DEVICES

[75] Inventor: David I. Poisner, Folsom, Calif.

[73] Assignee: Intel Corporation, Santa Clara, Calif.

[21] Appl. No.: 777,550

[22] Filed: Dec. 30, 1996

[51] Int. Cl.$^6$ .................................................. G06F 1/32
[52] U.S. Cl. ............................. 395/750.01; 395/750.02; 395/306; 395/308
[58] Field of Search .................. 395/750.03, 750.04, 395/750.05, 306, 308, 750.01, 750.02; 364/707

[56] References Cited

U.S. PATENT DOCUMENTS 5,475,854  12/1995  Thomsen et al. ..................... 395/843
5,493,684   2/1996  Gephardt et al. .................. 395/750.04

*Primary Examiner*—Meng-Ai T. An
*Assistant Examiner*—Rupal D. Dharia
*Attorney, Agent, or Firm*—Blakely, Sokoloff, Taylor & Zafman LLP

[57] ABSTRACT

A method and apparatus for signaling power management events between integrated circuit devices in a computer system. The method includes the step of receiving in a first device one of a plurality of signals indicating a power management event that affects power management of a second device. The method also includes the step of encoding the signal received and transmitting the encoded signal to a power management device. The encoded signal is decoded in the power management device and a particular power management signal is transmitted to the second device from the power management device. In one embodiment, the step of encoding includes configuring a plurality of serial bits for transmission to the power management device, wherein the particular configuration of the serial bits indicates particular power management information.

14 Claims, 3 Drawing Sheets

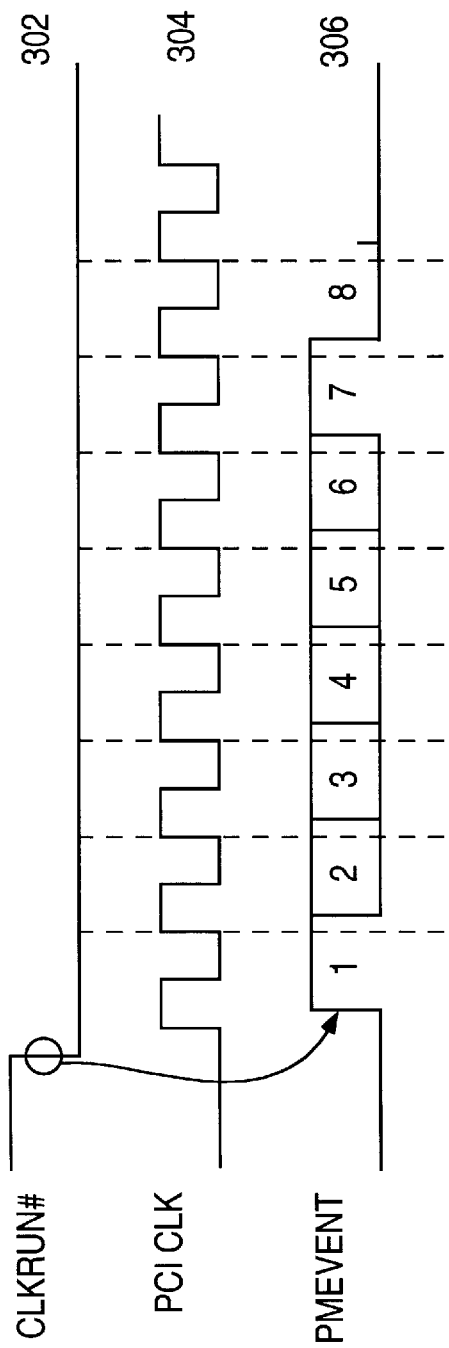

METHOD AND APPARATUS FOR SIGNALING POWER MANAGEMENT EVENTS BETWEEN TWO DEVICES

FIELD OF THE INVENTION

The present invention relates to the field of computer systems, more particularly to power management in computer systems.

BACKGROUND OF THE INVENTION

As computer systems become larger and more complex, power management continues to be a major design concern. This is true regardless of whether the computer system is on a large industrial hardware platform or a compact, mobile hardware platform. Power management concerns vary in type and in number between different system platforms. For example, power management is most critical in a mobile system because the system may be required to operate for extended periods on power supplied by a lightweight battery. In mobile systems, power to system components may be shut off under a greater number of conditions than in other systems. In addition, power management schemes differ between hardware platforms depending upon their complexity. A large industrial platform, for example, may use a particular computer system to perform many more tasks involving many more devices than would a mobile platform using a similar computer system.

Prior computer systems have commonly been designed as a set of integrated circuit components that perform different system tasks and are designed to be interconnected. The components of a typical computer system include a processor, a cache memory, a main memory, and one or more bridge devices for handling communications between devices on different buses of the system. For example, in a system with components on an industry standard architecture (ISA) bus and components on a peripheral component interface (PCI) bus, a bridge component is connected to both of the buses and provides a signal path between them.

A typical bridge component between a PCI and an ISA bus includes buffers for temporary storage of data to be transferred, arbitration circuits for gaining control of the PCI bus and the ISA bus and power management circuitry. Power management circuitry typically generates power management signals for transfer to system components from peripheral components. Examples of power management signals are interrupt signals sent to the processor and direct memory access signals sent to the main memory. Power management signals often require the receiving component to exit a low power state.

There are disadvantages associated with the traditional arrangement of computer systems that locates power management circuitry in a system component such as a bridge component. One disadvantage is that such an arrangement requires the component comprising the power management circuitry to include a separate physical path for each inter-component signal indicating a power management event. Different component packages use different arrangements for transmitting signals to and from the component package. An example of a traditional physical signal path is a pin of a dual in-line package (DIP). More recently, components are designed with small solder connections, or balls. Regardless of the component package style or the particular signal paths used, it is desirable to provide a minimum number of inter-component signal paths because they represent space taken in a system and expense in manufacture.

In prior systems, approximately 30 inter-component signal paths are devoted to transmitting signals that indicate power management events.

Another disadvantage is that integrated circuit area is used by the power management circuitry, making the computer system itself larger and more expensive to produce. Another, significant disadvantage exists with prior computer systems that have power management circuitry located on a system component. Power management circuitry is typically designed for the computer system as used with a particular hardware platform, e.g., a desktop platform. If it is desired to use the same system in another platform, e.g., a mobile hardware platform, the power management circuitry is typically not capable of handling the additional power management functions required. When this is the case, it is necessary to adapt the computer system to the hardware platform somehow.

Currently, separate components are used in addition to the computer system components when the computer system components can not handle all power management functions. Usually, these components are microcontrollers that include microcode designed for a particular application. The prior microcontroller components have disadvantages and limitations. A disadvantage is that the microcontroller requires a separate inter-component signal path for each signal it may receive indicating a power management event. This makes the microcontroller component large. A limitation of prior microcontroller power management components is that they are coupled to the ISA bus rather than to the PCI bus. For this reason, prior power management components cannot monitor the PCI bus, detect central processing unit (CPU) and PCI bus activity relating to power management and respond by transmitting appropriate signals.

What is needed is a computer system that is portable between hardware platforms and that does not require extensive circuitry and inter-component signal paths for power management. A separate power management component is also needed to operate with the computer system on different hardware platforms and efficiently handle all power management events associated with the hardware platform.

The present invention provides a method and apparatus for allowing a particular computer system to operate on different hardware platforms without the addition of extra circuitry or inter-component signal paths to handle power management events that are unique to a particular hardware platform.

SUMMARY OF THE INVENTION

A method and apparatus for signaling power management events between integrated circuit devices in a computer system is described. The method includes the step of receiving in a first device one of a plurality of signals indicating a power management event that affects power management of a second device. The method also includes the step of encoding the signal received and transmitting the encoded signal to a power management device. The encoded signal is decoded in the power management device and a particular power management signal is transmitted to the second device from the power management device. In one embodiment, the step of encoding includes configuring a plurality of serial bits for transmission to the power management device, wherein a particular configuration of the serial bits indicates particular power management information.

BRIEF DESCRIPTION OF THE DRAWINGS

FIG. 3 is a timing diagram including a power management event signal of one embodiment.

DETAILED DESCRIPTION

Figure 1:
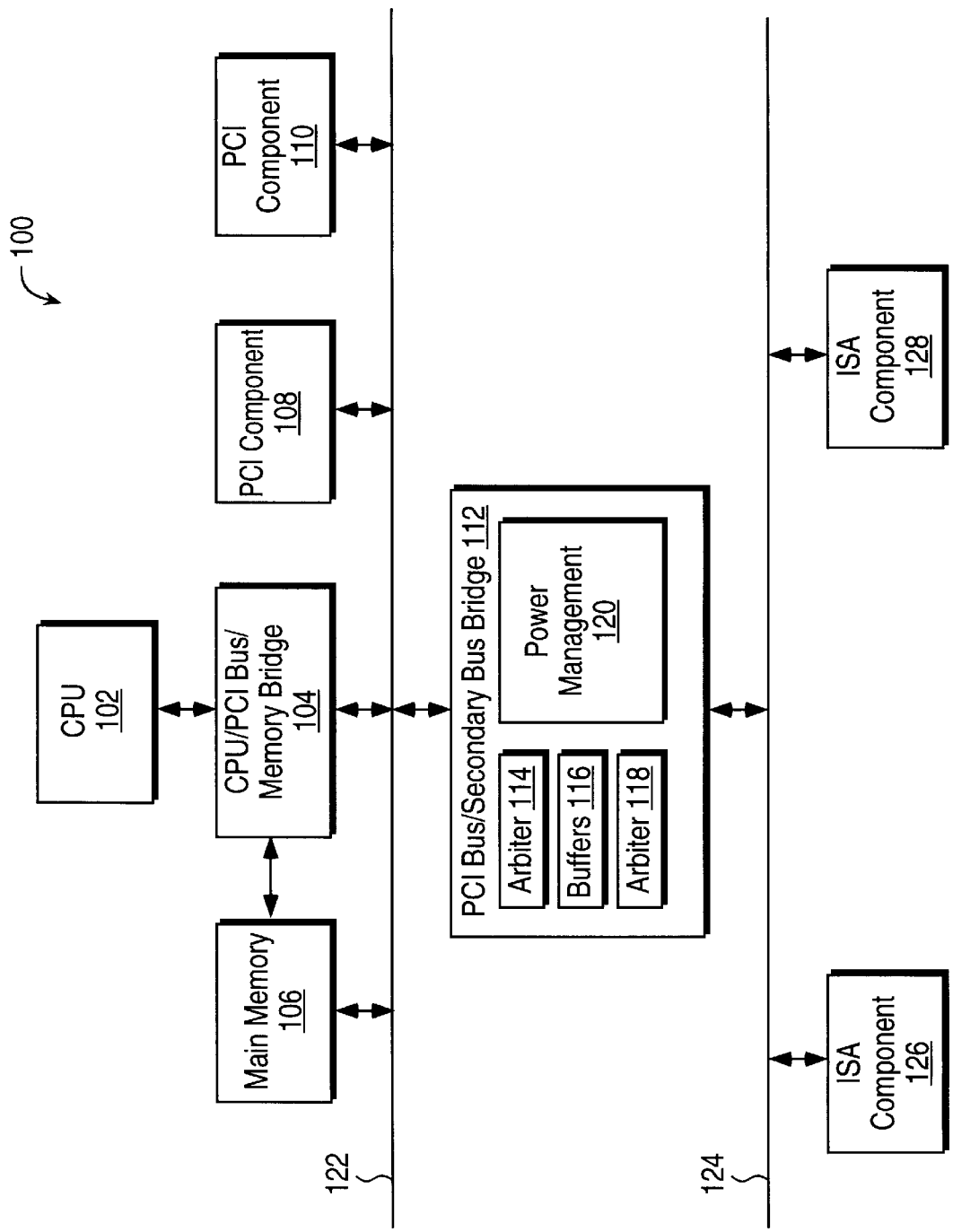
FIG. 1 is a block diagram of a prior art computer system.

FIG. 1 is a block diagram of prior art computer system 100 which includes computer system components and peripheral components. Central processing unit 102 performs operations on data from other components in the system. CPU/CPI bus/memory bridge 104 is interposed between CPU 102 and PCI bus 122. Bridge 104 is also coupled to main memory 106. Main memory 106 and PCI components 108 and 110 are connected to PCI bus 122. Bridge circuit 104 provides an interface between components connected to PCI bus 122 and components connected to CPU 102. Prior art computer system 100 includes ISA bus 124. Peripheral ISA components 126 and 128 are coupled to ISA bus 124. PCI bus/secondary bus bridge 112 is interposed between PCI bus 122 and ISA bus 124. Bridge 112 includes arbiter 114 for controlling access to PCI bus 122, and arbiter 118 for controlling access to ISA bus 124. Bridge 112 also include buffers 116 for temporarily storing data transferred between PCI bus 122 and ISA bus 124. Bridge 112 also includes power management circuitry 120.

Power management circuitry 120 is designed to receive certain predetermined power management signals from components on ISA bus 124. Bridge 112 includes approximately 30 inter-component signal paths dedicated to receiving signals from components on ISA bus 124 that indicate power management events. Computer system 100, including power management circuit 120, is designed to operate in a desktop hardware environment. For this reason, computer system 100 is not completely portable to other hardware platform environments without some modification to power management circuitry 120 of bridge 112 or the addition of extra circuitry (not shown) for handling power management events unique to the different hardware platform.

Figure 2:
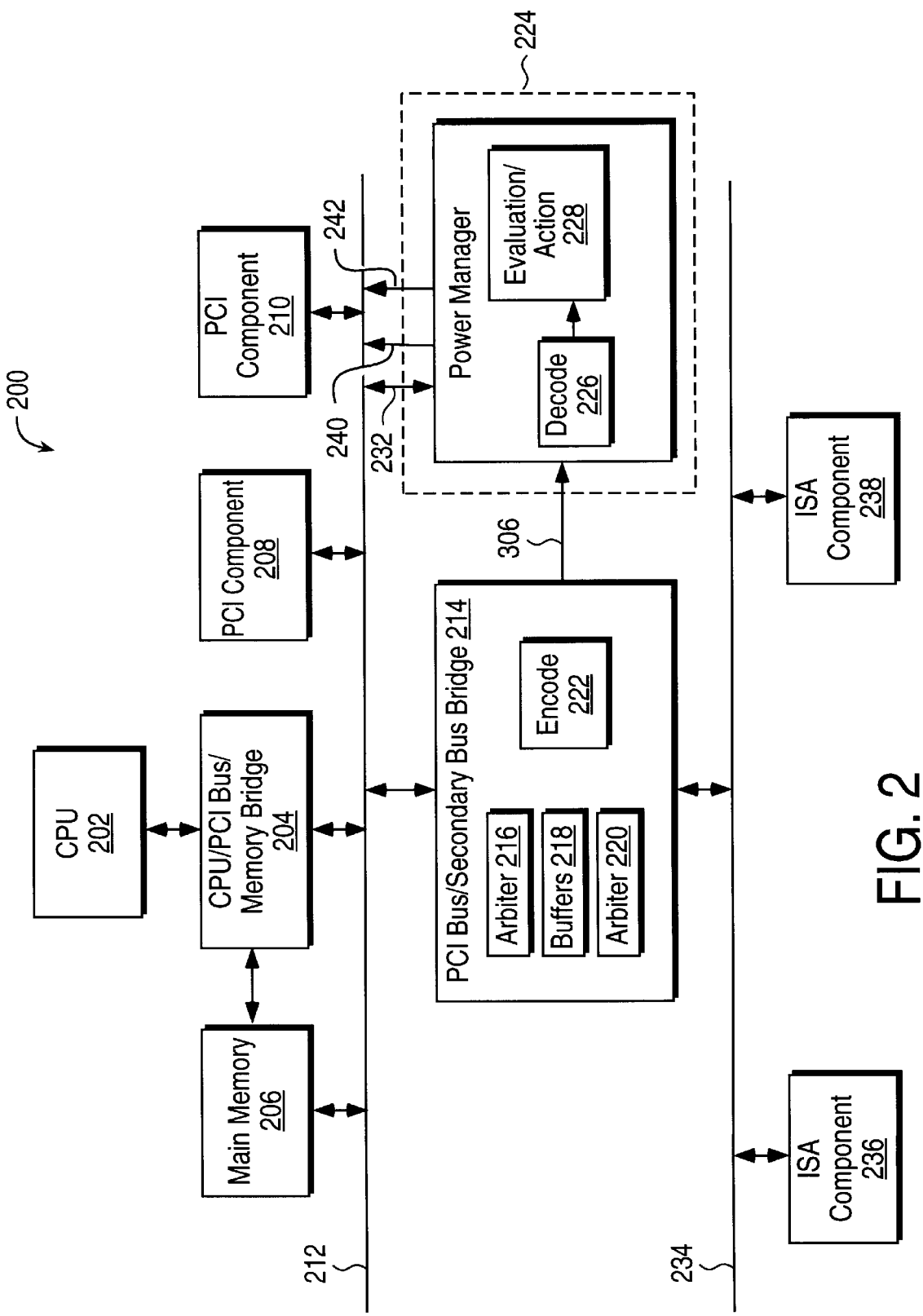
FIG. 2 is a block diagram of a computer system and power manager according to one embodiment of the present invention.

FIG. 2 is a block diagram of computer system 200 and power manager 224 according to an embodiment of the present invention. Computer system 200 comprises system components and peripheral components. CPU 202 performs operations upon data and performs other functions such as managing memory. Computer system 200 includes PCI bus 212 and ISA bus 234. Peripheral PCI components 208 and 210 are coupled to PCI bus 212. Main memory 206 is coupled to PCI bus 212 and also coupled directly to CPU/PCI bus/ memory bridge 204. Bridge 204 is interposed between CPU 202 and PCI bus 212. Bridge 204 controls transmission of data between memory 206 and CPU 202 and also between any other component on PCI bus 212 and CPU 202.

ISA components 236 and 238 are coupled to ISA bus 234. PCI/secondary bus bridge 214 is interposed between ISA bus 234 and PCI bus 212. Bridge 214 includes arbiter 216 for controlling access to PCI bus 212 and arbiter 220 for controlling access to ISA bus 234. Bridge 214 also includes buffers 218 for temporary storage of data being transferred between ISA bus 234 and PCI bus 212.

Bridge 214 also includes encoding circuit 222. Encoding circuit 222 receives all signals related to power management events. The signal relating to power management events can originate, for example, in components on ISA bus 234, but can also originate in any other component in computer system 200. Encoding circuit 222 receives the power management signals and encodes them according to a protocol. As will be described in more detail below, encoding circuit 222 encodes power management events according to a serial protocol. In this embodiment a single inter-component signal path is required to transmit encoded power management event (PMEVENT) signal 306 to power manager 224. Similarly, a single inter-component signal path is required on power manager 224 to receive serially encoded PMEVENT signal 306 from encoding circuit 222.

Power manager 224 includes decoding circuit 226 and evaluation/action circuit 228. Power manager 224 is coupled to PCI bus 212 by line 232 which transmits PCI address, PCI control, PCI signal and PCI clock (PCI CLK) signals. An advantage of locating power manager 224 on PCI bus 212 is that, in some embodiments, power manager 224 can sense and respond to power management events on PCI bus 212. PCI bus 212 is an industry standard bus, as is known in the art. The PCI CLK signal is a positive edge-triggered signal.

Power manager 224 is further coupled to the PCI bus 212 by line 240 and line 242. Line 240 transmits clock control signals from evaluation/action circuit to PCI bus 212. Line 242 transmits power plane control signals from evaluation/action circuit to PCI bus 212.

Decoding circuit 226 receives encoded, serial PMEVENT signal 306 and decodes the signal. The decoded PMEVENT signal is then transmitted to evaluation/action circuit 228, which evaluates the decoded PMEVENT signal and takes appropriate action based upon a particular hardware platform on which computer system 200 operates. Actions taken by evaluation/action circuit 228 include, for example, turning on or off system clocks by transmitting clock control signals via line 240 to system clock generators. Actions taken further include turning on or off system power planes by transmitting power plane control signals via line 242 to system power plane field effect transistors (FETs). In other embodiments, some clock generators and power plane FETs can exist on power manager 224. In these embodiments, clock control and power plane control signals transmitted to these clock generators and power plane FETs do not exit power manager 224 when generated by evaluation/action circuit 228.

According to the present invention, power manager 224 is designed to interpret encoded power management events as required by a particular hardware platform on which computer system 200 resides. Specifically, evaluation/action circuit 228 is designed for a particular platform. For this reason computer system 200 can be used with various hardware platforms, for example as a desktop system or a mobile laptop system, much more easily and efficiently that was possible with the prior art. This is because bridge circuit 214 is not required to include circuitry to handle all possible power management events that may be generated in a particular hardware platform. Power manager 224 is designed to handle power management signals related to a particular platform. In this embodiment, power manager 224 and bridge 214 both receive a PCI clock signal. Encoding circuit 222 and decoding circuit 226 operate at the rate of the PCI clock. Because encoding and decoding are synchronized by the PCI clock, only one inter-component signal path is needed to receive encoded PMEVENT signal 306. Therefore it is not necessary to reproduce all the inter-component signal paths that exist on bridge circuit 214 for receiving power management signals. This conserves approximately 30 inter-component signal paths on power manager 224, allowing the integrated circuit to be smaller and, therefore, more economically produced. It is possible in other embodiments to encode and decode a signal such as PMEVENT signal 306 asynchronously and to use more than one inter-component signal path for transmission and receipt of the signal.

FIG. 3 is a timing diagram illustrating a power management signal protocol according to one embodiment of the present invention. CLOCKRUN# 302 is an optional signal according to the PCI bus protocol. In this embodiment, CLOCKRUN# signal 302 is output by bridge 214 to ensure that PCI clock signal 304 is enabled. PMEVENT signal 306 is transmitted by encoding circuit 222 and received by decoding circuit 226. EVENT signal 306 is an illustration of a protocol for this embodiment. The protocol illustrated by PMEVENT signal 306 will be explained with reference to Table 1 and FIG. 3.

PMEVENT signal 306 shows eight separate bits 1 through 8,

TABLE 1

| Bit | Name | If in POS State | If Not in POS State |
|---|---|---|---|
| 1 | Start | Will always be active (high). | Will always be active (high). |
| 2 | Break/Resume | Will be active to indicate that a Resume Event occurred. | Will be active to indicate a Break Event occurred. |
| 3 | Burst | Don't Care. Burst can't occur from POS. | Will be active to indicate a Burst event occurred. |
| 4 | Burst Type | Don't Care. Burst can't occur from POS. | If a Burst occurred (as indicated in bit 3), this bit will indicate if it is a fast burst (0) or a slow burst (1). By keeping this separate from bit 3, a system can choose to ignore bit 4 and use the same burst time for slow and fast bursts. |
| 5 | Global Reload | Don't Care. Global Reload can't occur from POS. | Will be active to indicate a reload of the Global Standby Timer should be done. |
| 6 | Reserved | Reserved for future expansion | Reserved for future expansion. |
| 7 | Stop1 | Will always be high. | Will always be high. |
| 8 | Stop2 | Will always be low. | Will always be low. | that are received and evaluated by power manager 224 in synchronization with PCI CLK 304. The eight bits of PMEVENT signal 306 comprise one complete information frame for this particular protocol. Other embodiments could employ different protocols, including protocols that are not serial protocols. For embodiments that include protocols that are not serial, a greater number of intercomponent signal paths would be required on power manager 224.

According to this embodiment, computer system 200 operates in either a power on state or power on suspend (POS) state. When in the power on state, all components of computer system 200 are powered and provided with a clock signal. When in the POS state, components of computer system 200 are powered but their clock signals are disabled. As shown in Table 1, evaluation/action circuit 228 evaluates individual bits of PMEVENT signal 306 differently depending upon whether the system is in a power on state or POS state.

Referring to Table 1, bit 1 of PMEVENT signal 306 is evaluated by evaluation/action circuit 228 as a start bit. Bit 1 is always in an active state, in this embodiment a high voltage state. As is known in the art start bits and stop bits are used in serial protocols to indicate the beginning and end of an information frame. Bit 2 is evaluated as a break/resume bit. If computer system 200 is in a POS state, an active break/resume bit will be evaluated to indicate that a resume event occurred. If computer system 200 is not in a POS state, an active break/resume bit will be evaluated to indicate that a break event occurred. A break event causes the CPU to exit a state in which the instruction stream had been halted. A resume event causes computer system 200 to exit the POS state. For purposes of this invention the actual logic state corresponding to an active break/resume bit is not important.

This is also true of other information bit 2, 3, 4 and 5. These information bits could be active high or active low. Bit 3 is a burst bit. A burst event is like a temporary break event, that is, the instruction stream of CPU 202 is restarted for a predetermined period of time. If computer system 202 is in a POS state, the state of burst bit 3 is insignificant because a burst cannot occur from a POS state in this embodiment. If computer system 202 is not in a POS state, an active burst bit is evaluated by evaluation/action circuit 228 to indicate that a burst event has occurred.

In systems in which a burst can be of a slow type or a fast type, burst type bit 4 is used to indicate which type of burst occurred. If computer system 202 is in a POS state, the state of burst type bit 4 is insignificant because a burst cannot occur from a POS state. If computer system 200 is not in a POS state and a burst has occurred, as indicated by bit 3, burst type bit 4 indicates whether a burst is a fast burst or a slow burst depending upon the state of burst bit 4. In systems which only have one type of burst it is possible to either ignore this bit or to use it to indicate another type of event. Bit 5 is a global reload bit. In this embodiment a global standby timer is used in order to save power. A global standby timer is set to run for a predetermined amount of time at the expiration of which clocks to computer system components are disabled. Specifically, if the predetermined amount of time passes without the occurrence of a power management event, such as a resume event, then clocks to system components will be disabled. A global reload event indicates that the global reload timer should be reinitialized or reloaded to begin counting again. A global reload cannot occur if a computer system is in a POS state. Therefore the state of global reload bit 5 has no significance when computer system 200 is in a POS state. If computer system 200 is not in a POS state, an active global reload bit 5 is evaluated to indicate that a reload of the global standby timer should be done. Bit 6 in this embodiment is not assigned to a power management event. In other embodiments any power management event could be assigned to this reserved bit. Bits 7 and 8 are stop bits 1 and 2, respectively, that indicate the end of the information frame of PMEVENT signal 306. In this embodiment, evaluation/action circuit 228 recognizes the end of an information frame when it receives a high bit followed by a low bit. Other stop indications, including single stop bits, could be used.

In the forgoing specification, the invention has been described with reference to specific exemplary embodiments thereof. For example, the present invention has been described with reference to a PCI bus and to PCI bus signals. It will, however, be evident that various modifications and changes may be made thereto, without departing from the broader spirit and scope of the invention as set forth in the appended claims. For instance, in some embodiments, power manager 224 could be coupled to an ISA bus. The specification and drawing are, accordingly, to be regarded in an illustrative rather than a restrictive sense.

What is claimed is:

1. An integrated circuit power management apparatus coupled to at least one of a plurality of buses for signaling power management events between integrated circuit devices in a computer system, comprising:

an input that receives coded data from a bus bridge of the computer system wherein the bus bridge is coupled to each of the plurality of buses;

decoding circuitry that decodes the coded data;

evaluation/action circuitry that evaluates the decoded data and determines an action to be taken in response to the decoded data; and an output that transmits a power management signal to a first component coupled to a first bus of the plurality of buses based on the decoded data;

wherein the bus bridge includes a plurality of inter-component signal paths each receiving one of a plurality of signals indicating power management events originating in components of the computer system and wherein the bus bridge is coupled to the power management apparatus and transmits the coded data from one inter-component signal path of the bus bridge to one inter-component signal path of the power management apparatus.

2. The power management apparatus of claim 1, wherein the bus bridge receives event data from a component on a second bus of the plurality of buses and encodes the data to produce the coded data that is received by the power management apparatus.

3. The power management apparatus of claim 1, wherein the bus bridge receives event data from a component on the first bus that is different from the first component coupled to the first bus and encodes the data to produce the coded data that is received by the power management apparatus.

4. The power management apparatus of claim 2, wherein the first bus is a peripheral component interface (PCI) bus, the first component is a PCI component, and wherein the encoding and decoding are synchronized by a PCI clock signal.

5. The power management apparatus of claim 4, wherein the second bus is an industry standard architecture (ISA) bus and the second component is an ISA component.

6. A computer system, comprising:

a processor;

a first bus coupled to the processor;

a memory system coupled to the processor and to the bus;

a bridge circuit coupled to the first bus and to a second bus that transmits data between a plurality of devices of the computer system, comprising;

a plurality of inter-component signal paths receiving a plurality of signals each from one of the plurality of devices and each indicating a power management event; and an encoding circuit that encodes the plurality of signals received and outputs data comprising the encoded signals on at least one output inter-component signal path; and a power management circuit coupled to the at least one output inter-component signal path of the bridge circuit and to the first bus, comprising:

a decoding circuit that receives and decodes the encoded signals; and an evaluation/action circuit coupled to the decoding circuit that transmits power management signals to the first bus in response to the decoded signals.

7. The computer system of claim 6, wherein one of the power management signals is a clock control signal transmitted to a clock generator.

8. The computer system of claim 6, wherein one of the power management signals is a power plane control signal transmitted to a power plane field effect transistor (FET).

9. The computer system of claim 6, wherein the power management circuitry further includes at least one clock generator and at least one power plane FET, and wherein the power management signals are also transmitted to the at least one clock generator and to the at least one power plane FET.

10. The computer system of claim 6, wherein the first bus is a peripheral component interface (PCI) bus including a PCI clock signal and wherein the encoding circuit encodes at a rate of the PCI clock and the decoding circuit decodes at the rate of the PCI clock.

11. The computer system of claim 6, wherein the system operates in either a power on state or a power on suspend (POS) state wherein components of the system are supplied power but are not supplied a clock signal, and wherein the evaluation/action circuit transmits power management signals to the bus in response to whether or not the system is in a POS state.

12. The computer system of claim 6, wherein the encoding circuit encodes the plurality of signals into a serial format and wherein the decoding circuit associates a particular bit of the serial format with a particular power management event.

13. The computer system of claim 12, wherein the evaluation/action circuitry determines whether to transmit a particular power management signal based upon the state of the particular bit and upon whether the system is in a POS state.

14. The computer system of claim 6, wherein the power management device is an integrated circuit that manages power consumption for a specific hardware platform in which the computer system resides.

* * * * *

UNITED STATES PATENT AND TRADEMARK OFFICE
CERTIFICATE OF CORRECTION

PATENT NO.    :    5,890,004
DATED    :    March 30, 1999
INVENTOR(S)    :    David I. Poisner It is certified that error appears in the above-identified patent and that said Letters Patent is hereby corrected as shown below:

In column 5 at line 8 delete "EVENT" and insert -- PMEVENT --

Signed and Sealed this

Fifteenth Day of August, 2000

Attest:

Q. TODD DICKINSON

*Attesting Officer*    *Director of Patents and Trademarks*